United States Patent
Krug et al.

(10) Patent No.: US 7,014,019 B2
(45) Date of Patent: Mar. 21, 2006

(54) BRAKE ACTUATOR COMPRISING AN ENERGY ACCUMULATOR AND AN INERTIA WEIGHT

(75) Inventors: Rita Krug, München (DE); Ulf Friesen, München (DE); Josef Staltmeir, München (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 144 days.

(21) Appl. No.: 10/451,014

(22) PCT Filed: Dec. 13, 2001

(86) PCT No.: PCT/EP01/14681

§ 371 (c)(1),
(2), (4) Date: Oct. 14, 2003

(87) PCT Pub. No.: WO02/49901

PCT Pub. Date: Jun. 27, 2002

(65) Prior Publication Data

US 2004/0074709 A1    Apr. 22, 2004

(30) Foreign Application Priority Data

Dec. 19, 2000  (DE) ................. 100 63 229
Feb. 12, 2001  (DE) ................. 101 06 373

(51) Int. Cl.
*B60T 13/04* (2006.01)
*B60T 8/72* (2006.01)

(52) U.S. Cl. ............... 188/167; 188/173; 188/180
(58) Field of Classification Search ............ 188/73.36, 188/73.37, 166, 167, 170, 171, 173, 180
See application file for complete search history.

(56) References Cited

U.S. PATENT DOCUMENTS

| | | | | |
|---|---|---|---|---|
| 3,927,738 A | * | 12/1975 | Ernst | 188/170 |
| 5,092,432 A | * | 3/1992 | Taig | 188/171 |
| 5,992,575 A | * | 11/1999 | Kim | 188/38 |

FOREIGN PATENT DOCUMENTS

| | | |
|---|---|---|
| DE | 34 23 510 A1 | 1/1986 |
| EP | 0 247 733 A2 | 12/1987 |
| EP | 0 334 434 A2 | 9/1989 |
| WO | WO 98/47750 | 4/1998 |

* cited by examiner

*Primary Examiner*—Thomas Williams
(74) *Attorney, Agent, or Firm*—Barnes & Thornburg; Perry Palan

(57) ABSTRACT

The invention relates to a brake actuator, especially for a rail vehicle brake, comprising an accumulation brake unit having an energy accumulator for storing and supplying energy for applying the brake, preferably in the event of safety braking and/or park braking, and a locking device for locking and unlocking the energy accumulator. After the release of the locking device, an inertia weight from part of the energy released from the energy accumulator can be subjected to a rotational movement for damping purposes.

13 Claims, 2 Drawing Sheets

BRAKE ACTUATOR COMPRISING AN ENERGY ACCUMULATOR AND AN INERTIA WEIGHT

BACKGROUND AND SUMMARY OF THE INVENTION

The invention relates to a brake actuator, particularly for a rail vehicle brake.

Currently, three types of wheel braking systems are essentially used in the rail vehicle field: Pneumatic or electro-pneumatic braking systems, hydraulic or electro-hydraulic braking systems as well as mechanical or electromechanical braking systems. The wheel braking system may be constructed as an active or passive braking system, depending on whether the power of the brake actuator has to be applied for the engaging (active braking system) or for the releasing of the brake (passive braking system). In case of operating disturbances, energy is stored in air brake reservoirs if pneumatic systems are used; energy is stored in hydraulic reservoirs if hydraulic systems are used; and energy is accumulated in the form of accumulator-type springs when electromechanical systems are used.

From the prior art, electromechanical rail vehicle brakes are known which have a service-type brake unit as well as an accumulator-type brake unit which has an energy accumulator. The service-type brake unit contains a braking power generator for the application and/or release of the brake; for example, in the form of an electric-motor drive. The accumulator-type brake unit comprises at least one energy accumulator for the storage and supply of energy for the application of the brake as a service-type emergency brake when the service-type brake unit fails, and/or as a parking brake. The accumulator-type brake unit is generally constructed as a spring-loaded brake. A power converter provides a conversion of the energy supplied by the braking power generator and/or by the energy accumulator to a brake application movement and comprises, for example, a brake spindle driven by the electric-motor drive.

When the spring-loaded brake is triggered in the event of a parking braking or an emergency braking, the potential energy stored in the accumulator-type spring is abruptly released and is converted to high kinetic energy of the elements of the power converter which, after the braking position has been reached, are also abruptly decelerated. In this case, the braking system is subjected to high forces which may result in premature wear or damage.

In view of the above, the present invention is based on a brake actuator which, when the accumulator-type brake unit is triggered, lower loads will occur, while the braking effect is simultaneously high. Furthermore, this object is to be connected with lower constructional costs and should be able to be implemented in a space-saving manner.

Because the potential energy abruptly released when the accumulator-type brake is triggered is, for the most part, converted to rotational energy of the inertia weight, the remaining kinetic energy, by means which the elements of the power converter can be accelerated in the brake application direction, is reduced. For this reason, the shock load acting upon the braking system is reduced, whereby its service life and reliability is increased. The inertia weight is provided in addition to possibly already existing rotational bodies used exclusively for locking the accumulator-type brake unit. The rotational bodies also rotate after the release of the locking device. In particular, the inertia weight has a mass moment of inertia which is sufficient for a noticeable damping of the release of energy abruptly occurring during the release of the locking device. In comparison to linearly moving inertia weights, which require a relatively long acceleration path for generating a significant energy dissipation, less space is required for rotatory inertia weights. In addition, in contrast to oil-pressure-type or gas-pressure-type shock absorbers, the rotational inertia weight can be used independent of the temperature.

According to a particularly preferred arrangement, the forces and/or torques generated by the energy accumulator, when the locking device is locked, can be introduced at least by a portion of the inertia weight into a housing of the brake actuator and can be supported there. As a result, the inertia weight forms a component of the locking device and is integrated into its flux of force. The inertia weight therefore has a double function in that, in addition to reducing excess energy, it simultaneously acts as a locking element, whereby a particularly space-saving and light construction is obtained.

According to a further development, a transmission gearing with a preferably large gear ratio is arranged between the energy accumulator and the inertia weight. As a result, the forces are reduced which have to be applied for locking the inertia weight, which is simultaneously used as a locking element, in the release position. When the inertia weight is locked, for example, by electromagnetic holding forces, solenoid coils of a lower magnetic force are sufficient, whereby the current consumption and the heating-up of the brake actuator are reduced. Simultaneously, because of the large ratio, the rotational speed of the inertia weight is increased which is entered in a squared manner into the rotational energy, so that a high degree of damping will exist when the accumulator-type brake unit is triggered.

The inertia weight is expediently releasably coupled with the energy accumulator by a slipping clutch which is designed such that, after the braking position has been reached, the inertia weight is uncoupled from the energy accumulator. If the inertia weight and the bearing frictions are designed such that the inertia weight continues to rotate after the braking position has been reached, as a result of this arrangement, a gradual reduction of the rotational energy stored in it can take place, which has a positive effect on the service life of the brake actuator.

These and other aspects of the present invention will become apparent from the following detailed description of the invention, when considered in conjunction with accompanying drawings.

DETAILED DESCRIPTION OF THE PREFERRED EMBODIMENTS

Figure 1:
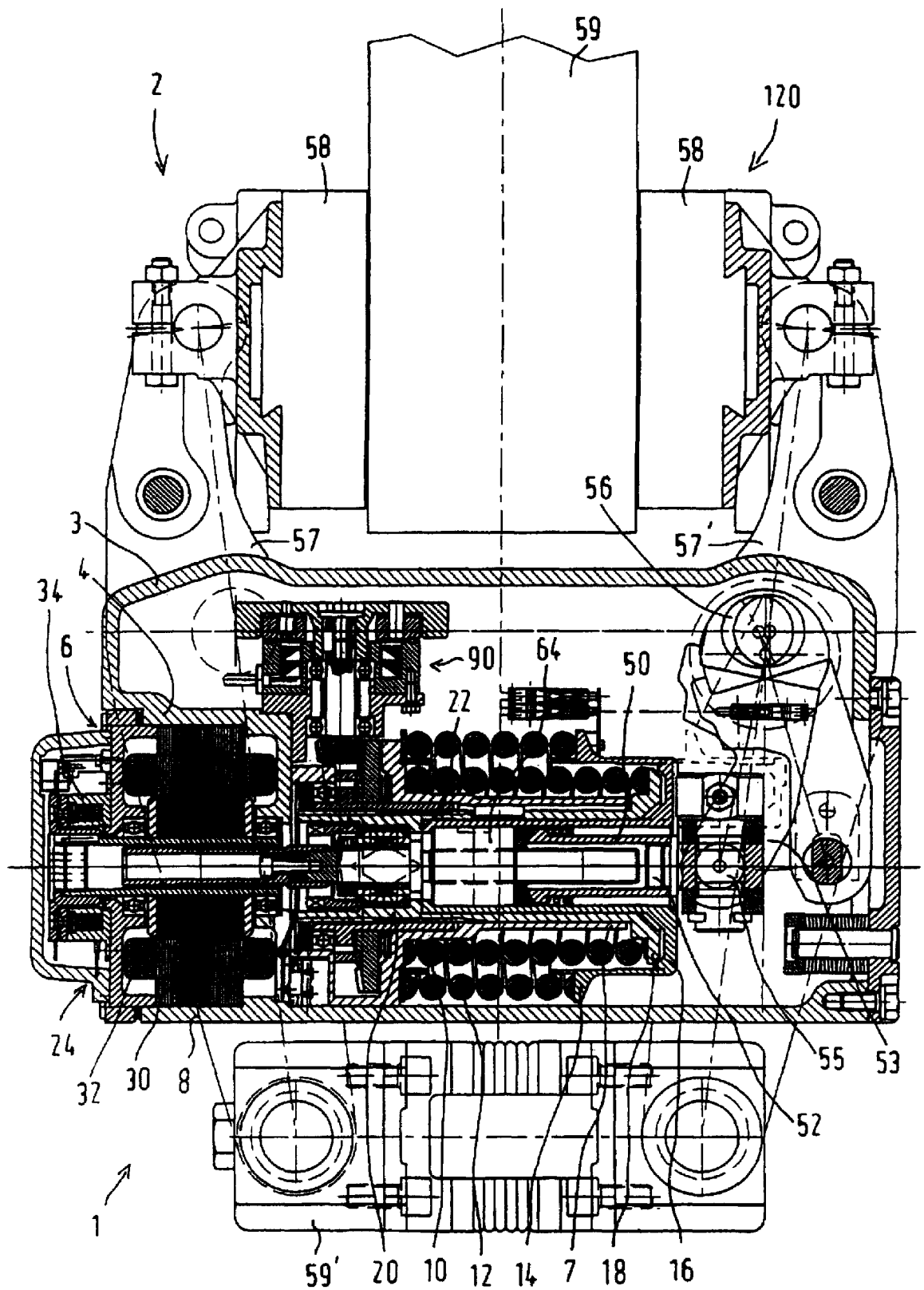
FIG. 1 is a sectional view of a preferred embodiment of a brake actuator according to the invention in the release position.

The preferred embodiment of a brake actuator, which as a whole has the reference Number 1 in FIG. 1 and is illustrated in a release position, is used as the driving unit of an electromechanical brake application device 2 of a rail vehicle. The brake actuator 1 has an essentially hollow-cylindrical actuator housing 3 which is closed off by a lid section 4 toward an axial end. The lid section 4 has an end-side opening 6. Starting from the lid section 4, the actuator housing 3 has an essentially double-walled construction. In the space between an interior wall 7 and an exterior wall 8, an interior accumulator-type spring 10 and an exterior accumulator-type spring 12 coaxial thereto being arranged. The exterior accumulator-type spring 12 encloses the interior accumulator-type spring 10.

The accumulator-type springs 10, 12 are preferably constructed as coil springs and are in each case supported by their one end on the actuator housing 3. The exterior accumulator-type spring 12 is supported by its other end on a ring collar 14 of an exterior sliding sleeve 16. The interior accumulator-type spring 10 is supported by its other end on a ring collar 18 of an interior sliding sleeve 20. The interior sliding sleeve 20 is arranged between the exterior sliding sleeve 16 and the interior wall 7 of the actuator housing 3. Furthermore, the interior and the exterior sliding sleeve 16, 20 are displaceably guided in the axial direction on one another, and the interior sliding sleeve 20 is displaceably guided on a radially interior circumferential surface of the interior wall 7 of the actuator housing 3. In the release position, the exterior sliding sleeve 16 comes to rest on an axial stop 22 of the interior sliding sleeve 20. In addition, the ring collar 14 of the exterior sliding sleeve 16 projects over the ring collar 18 of the interior sliding sleeve 20 in the axial and radial direction.

Figure 2:
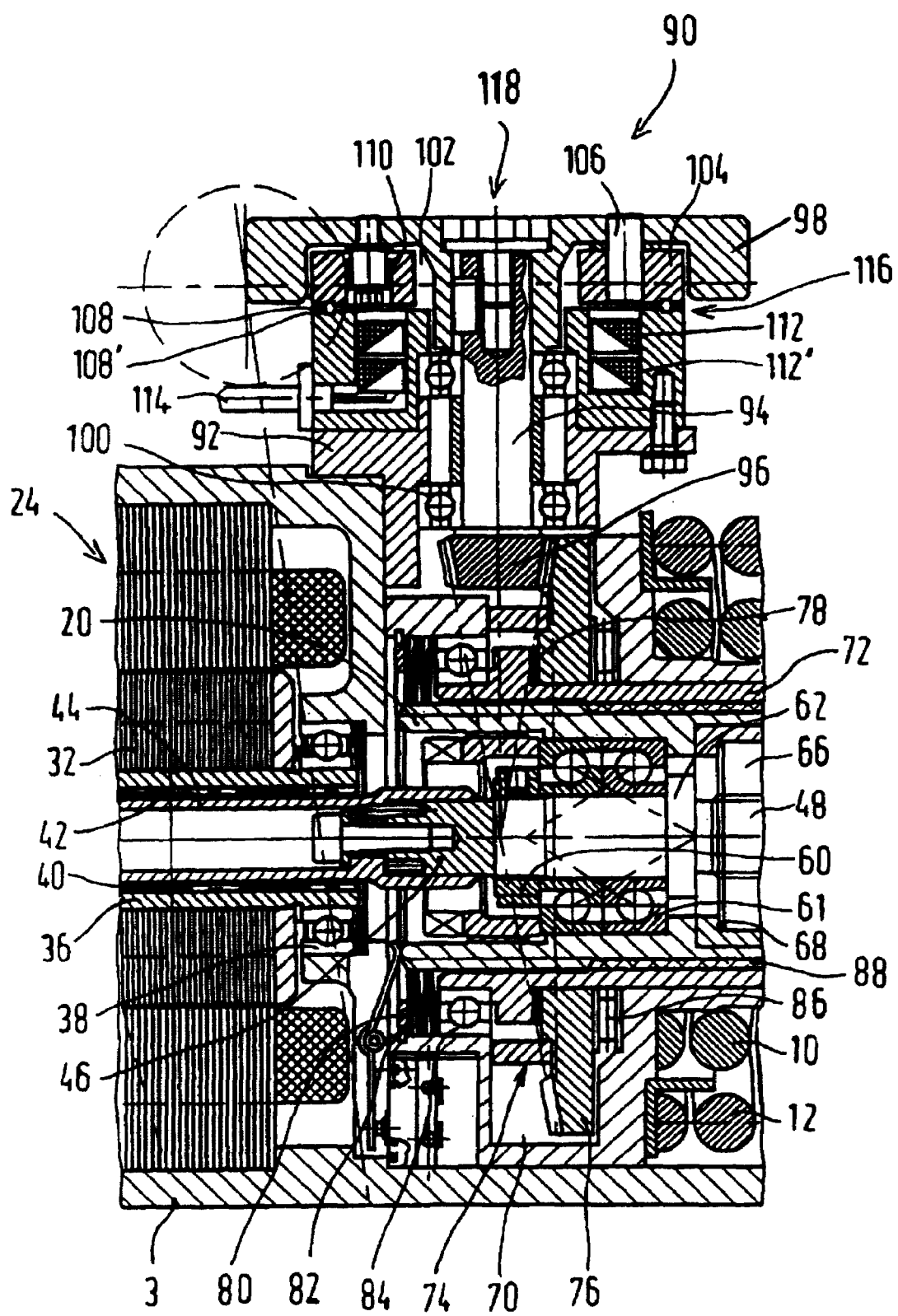
FIG. 2 is a view of the locking device of an accumulator-type brake unit of the brake actuator as an enlarged cutout of FIG. 1.

In the lid section 4, an SR motor 24 (switched reluctance motor), which can be operated in the four-quadrant operation, is accommodated on the side facing away from the accumulator-type springs 10, 12. The SR motor 24 contains a radially exterior, housing-fixed stator 30 which encloses a rotor 32 which can be braked by a holding brake 34, preferably a permanent magnet brake, which is closed when it is not energized and open when it is energized. As best illustrated in FIG. 2, the rotor 32 is disposed on a hollow shaft 36 which is rotatably disposed by ball bearings 38 in the actuator housing 3. On its radially interior circumferential surface, the rotor 32 has an axially extending spline toothing 40, which engages radially exterior wings 42 of an intermediate sleeve 44 which extend in the axial direction. As a result, the intermediate sleeve 44 is non-rotatably but axially displaceably guided relative to the hollow shaft 36.

An end-side pin 46 of a brake spindle 48 projects coaxially into an end of the intermediate sleeve 44 facing the accumulator-type springs 10, 12 and is held there in a non-rotatable and axially fixed manner. The other end of the brake spindle 48 projects into a cup-shaped section 50 of a connecting rod 52 for an eccentric lever 53, as illustrated in FIG. 1. The cup-shaped section 50 of the connecting rod 52 is held axially fixed in the exterior sliding sleeve 16 but can also swing out laterally by a universal ball joint. An eye is shaped onto the face of the connecting rod 52 facing away from the accumulator-type springs 10, 12. A pin 55, which is connected with one end of the eccentric lever 53 of an eccentric arrangement, engages the eye. The eccentric arrangement has an eccentric shaft 56 which is linked to a forked lever 57 which, together with another formed lever 57', forms a caliper. At one end respectively of the calipers 57, 57', brake lining holders with brake linings 58 are in each case arranged which are displaceable in the direction of the axis of the brake disk 59. The ends of the forked levers 57, 57' facing away from the brake linings 58 are connected with one another by a plunger rod adjuster 59' which may be electrically operable.

As illustrated in FIG. 2, the brake spindle 48 is rotatably disposed within the interior sliding sleeve 20, for example, by a two-row deep groove roller ball bearing 61 which can absorb axial as well as radial forces and by which an interior ring of the bearings 61 is tensioned by a nut 60 against a shoulder 62 of the brake spindle 48. The nut 60 is screwed onto an external thread section of the brake spindle 48. As a result, the interior ring is held in a non-rotatable and axially fixed manner on the brake spindle 48. An exterior ring of the deep groove ball bearing 61 is also held in a non-rotatable and axially fixed manner in the interior sliding sleeve 20.

The brake spindle 48 is surrounded by a nut/spindle constructional unit 64, which can be constructed as a roller thread drive, such as a circulating ball spindle, a roller thread drive, a thread roller screw drive or as a planetary roller thread drive. The cup-shaped section 50 of the connecting rod 52 is inserted into the exterior sliding sleeve 16 to such an extent that the nut 66 of the nut/spindle constructional unit 64 is clamped between a radially interior projection 68 of the exterior sliding sleeve 16 and a face of the cup-shaped section 50 of the connecting rod 52, so that it is held with respect to the latter in a manner which protects it against torsion. During rotations of the brake spindle 48, the nut 66 is therefore translatorily guided along the brake spindle 48 and in the process takes along the exterior sliding sleeve 16 and the connecting rod 52.

In the lid section 4 of the actuator housing 2, an annulus 70 is constructed in which a ring gear 76 is received coaxially to the brake spindle 48. The ring gear 76 is in a driving connection with a locking nut 72 by a slipping clutch 74. The ring gear 76 is disposed on the radially exterior circumferential surface of the locking nut 72 and is non-rotatably connected with the locking nut 72 by the slipping clutch 74 to an upper limit torque. The slipping clutch 74 is preferably formed by axially mutually engaging spur-type serrations 78 on the ring gear 76 and on the locking nut 72. A diaphragm spring assembly 82 is axially supported on the actuator housing 3 by a snap ring 80 and acts upon a radial deep groove ball bearing 84, which supports the locking nut 72 relative to the actuator housing 3. The spring assembly 82 provides the axial force required for a force and form closure of the spur-type serrations 78. On its side pointing away from the spur-type serrations 78, the ring gear 76 is axially disposed by an axial needle bearing 86 with respect to the actuator housing 3. The locking nut 72 encloses and is rotatably disposed on the interior sliding sleeve 20 by a non-self-locking thread 88.

A preferably electromagnetically operable locking device 90 has a housing 92 which is flanged to a radial opening of the annulus 70. The locking device 90 comprises a shaft 94 on whose radially interior end a bevel gear 96 is arranged and on whose opposite, radially exterior end, a cylindrical inertia weight 98 is arranged. The bevel gear 96 meshes with the toothing of the ring gear 76 and, together with it, forms a bevel gear pair which preferably has a relatively high transmission ratio, which is, for example, in a range of from 3.0 to 8.0. The shaft 94 is rotatably disposed in the housing 92 of the locking device 90 by deep groove ball bearings 100. The shaft 94 being arranged perpendicular to the brake spindle 48.

The inertia disk 98 has a ring recess 102 for a ring 104 on its face pointing to the brake spindle 48. The ring 104 is arranged coaxial to the shaft 94 and is displaceably received along pins 106 extending in the axial direction. The ring 104 is non-rotatably connected with the inertia disk 98. In addition, on its face pointing away from the inertia disk 98, the ring 104 has a radially external gear rim 108 which is situated opposite another gear rim 108' supported on the housing 92 of the locking device 90. The gear rim 108 is pushed away from that gear rim 108' by the pressure springs 110. Furthermore, two solenoid coils 112, 112' arranged behind one another in the axial direction in the housing 92 of the locking device 90 are situated opposite the ring 104. The solenoid coils 112, 112' can be energized by an electric connection 114. The ring 104, the two gear rims 108, 108' and that two solenoid coils 112, 112' together form a solenoid cogwheel brake 116.

When the solenoid coils 112, 112' are energized, magnetic attraction powers or fields are generated which move the ring 104 against the effect of the pressure springs 110 along the pins 106 in the axial direction toward the solenoid coils 112, 112'. Thus, the gear rim 108 of the ring 104 comes to engage with the gear rim 108' held on the housing 92 of the locking device 90 and thus enters into a non-rotatable connection therewith. Then, a torque introduced by the ring gear 76 into the locking device 90 can be supported on the housing 92 of the locking device 90. The flux of force extends through the bevel gear 96, the shaft 94 and the inertia disk 98.

In the release position of the solenoid cogwheel brake 116, the solenoid coils 112, 112', in contrast, are not energized, so that the gear rim 108 of the ring 104, as a result of the effect of the pressure springs 110, becomes disengaged from the gear rim 108' held on the housing 92 of the locking device 90. The ring gear 76, together with the bevel gear 96, the shaft 94 and the inertia disk 98, can therefore rotate freely with respect to the housing 92 of the locking device 90. The inertia disk 98, the ring 104, the shaft 94 and the bevel gear 96, together then form an inertia weight or mass 118, which can be rotated perpendicular to the brake spindle 48 or to the brake application direction and, relative to the slipping clutch 74, is arranged on the other side of the locking nut 72. Because of its radius, the inertia disk 98 is the largest portion of the mass moment of inertia of the inertia weight 118.

The SR motor 24 forms a braking power generator; the other elements of the power transmission path from the SR motor 24 to the forked levers 57, 57' form a braking power converter 120. Preferably, an electric motor 24 is used as a braking power generator. However, as an alternative, the braking power generator may also be a hydraulic or pneumatic brake cylinder acting in one or two operating directions, or another unit acting in one or two directions. The locking device 90, the permanent magnet brake 34 and the SR motor 24 can be controlled by an electronic control and regulating device which is not shown. With this background, the brake actuator 1 has the following function:

In the release position of the brake actuator 1 illustrated in FIG. 1, the exterior and the interior accumulator-type spring 10, 12 are preloaded. The force of the interior accumulator-type spring 10 is transmitted from the interior sliding sleeve 20 by the non-self-locking thread 88 to the locking nut 72 and from there by the slipping clutch 74 to the ring gear 76 and the inertia disk 98. As a result of the spring force of the interior accumulator-type spring 10, a torque is generated in the non-self-locking thread 88; that is, the locking nut 72 wants to rotate together with the inertia weight 118, which, however, is prevented by the energized and therefore closed solenoid cogwheel brake 116.

The power of the exterior accumulator-type spring 12 is supported by the exterior sliding sleeve 16 on the nut 66 of the nut/spindle constructional unit 64, although the nut/spindle constructional unit 64 is not self-locking. The reason is that the torque created because of the power of the exterior accumulator-type spring 12 in the brake spindle 48 is introduced by the permanent magnet brake 34 closed in the release position into the actuator housing 3. From the nut 66, the power flux extends by the brake spindle 48 and the two-row deep groove ball bearing 61 into the interior sliding sleeve 20 and, from there, takes the same path into the ring gear 76 as the force of the interior accumulator-type spring 10 to the inertia disk 98. This means that, in the release position, the exterior as well as the interior accumulator-type spring 10, 12 are held in the tensioned condition by the locking device 90.

During the transition from the release position to a service-type braking, the permanent magnet brake 34 is energized by the electronic control and regulating device. As a result, the brake 34 opens and permits a rotation of the SR motor 24 which is also supplied with electric energy by the control and regulating device. By means of the rotation of the rotor 32 and of the brake spindle 48, the nut 66 of the nut/spindle constructional unit 64, together with the exterior sliding sleeve 16 and the connecting rod 52, is moved out into the service-type braking position. This moving-out movement of the connecting rod 52 is supported or aided by the exterior accumulator-type spring 12 which, relative to the function, is connected parallel with the SR motor 24.

The controlling of the SR motor 24 by the control and regulating device and the exterior accumulator-type spring 12 are mutually coordinated such that the exterior accumulator-type spring 12 alone generates a defined braking power value which is between a minimal and a maximal braking power and defines an operational zero point. In the operational zero point, the SR motor 24 is switched currentless. The amount of the braking power acting in the operational zero point is therefore, among other things, a function of the spring rate of the exterior accumulator-type spring 12 and of the degree of the preloading. For achieving the maximal braking power, the SR motor 24 is controlled by the control and regulating device in the four-quadrant operation such that it supports the exterior accumulator-type spring 12 by a rotation in the brake application direction and by supplying a positive braking torque, which corresponds, for example, to an operation in the first quadrant. Although for achieving a braking power lower than in the operational zero point, the SR motor 24 rotates in the brake application direction, similar to a generator, it supplies a negative torque which acts by way of the nut/spindle construction unit 64 against the exterior accumulator-type spring 12 (operation in the second quadrant). The interior accumulator-type spring 10 does not participate in the generating of the service-type braking power and remains in the tensioned condition because the locking nut 72 is locked by the still energized solenoid cogwheel brake 116.

The controlled engaging of the parking brake is initiated by the above-described service-type braking until a braking power is reached which is approximately 20% lower than the final power to be achieved by means of the parking brake. By means of corresponding control signals of the control device, the SR motor 24 is stopped; the permanent magnet brake 34 is closed by an interruption of the current supply, and the solenoid cogwheel brake 116 is released by switching off the energization. Because of the spring force acting upon the interior sliding sleeve 20 and generated by the interior accumulator-type spring 10, a torque is generated in the non-self-locking trapezoidal thread 88 between the locking nut 72 and the interior sliding sleeve 20, which torque is no longer supported by the now freely rotatable inertia weight 118. The locking nut 72 therefore begins to rotate on the interior sliding sleeve 20 which then moves into the brake application direction and, by way of its axial stop 22, takes along the exterior sliding sleeve 16 with the connecting rod 52. Simultaneously, because of the spring force of the exterior accumulator-type spring 12, the unlocked exterior sliding sleeve 16 can move into the brake application direction. In this case, it is unimportant whether the permanent magnet brake 34 is open or closed, because the intermediate sleeve 44, together with the brake spindle 48, is axially displaced during this operation in the spline toothing 40 of the hollow shaft 36 of the rotor 32. A total braking power therefore acts in the parking braking position, which total braking power is a result of the sum of the spring forces of the two parallel acting accumulator-type springs 10, 12.

During the brake application movement, the rotation of the locking nut 72 is translated by the bevel gear pair 76, 96 into a rotation of the inertia weight 118 taking place at a higher rotational speed. Thus a large portion of the potential energy of the relaxing accumulator-type springs 10, 12 is converted to rotational energy. When the braking position has been reached, the entire energy supply can be switched off and the rail vehicle is reliably held in the parking braking position by the spring forces of the interior and exterior accumulator-type spring 10, 12. In order to maintain the resulting achieved parking braking power for an extended time period, only a slight relaxation may be permitted in the interior and the exterior accumulator-type spring 10, 12. The two accumulator-type springs 10, 12 preferably consist of high-strength silicon spring wire CrS1Va TH-381 HRA of the firm Trefileurope.

The rotation of the locking nut 72 stops with the reaching of the braking position. The slipping clutch 74 between the locking nut 72 and the ring gear 76 is designed such that the upper limit torque, starting at which a relative rotation can take place between the spur-type serrations 786, is exceeded by the torque from the product of the mass moment of inertia of the inertia weight 118 and of the deceleration in the braking end position existing after passing through the brake application stroke. Thus, after the braking end position has been reached, the inertia weight 118 can first continue to rotate and, essentially as a result of the friction taking place between the spur-type serrations 78 of the ring gear 76 and of the locking nut 72, is slowly caused to come to a stop. As a result, a gradual reduction of the rotational energy accumulated in the inertia weight 118 can take place.

If the current supply of the brake actuator 1 and/or the control and regulating device and a higher-ranking vehicle control fail during a service-type braking, the solenoid coils 112, 112' of the locking device 90 are no longer energized, so that the pressure springs 110 pull the ring 104 back in the direction of the inertia disk 98 and thereby release the solenoid cogwheel brake 116. The subsequent events are identical with those described above relative to a parking braking, so that, also in the event of an emergency or safety braking, the total braking power is a result of a sum of the spring forces of the two parallel acting accumulator-type springs 10, 12.

The release of the brake starting from the parking or emergency braking position takes place in two steps, in which case the interior accumulator-type spring 10 is tensioned first. The permanent magnet brake 34 is energized by the control and regulating device and is thereby opened, and the SR motor 24 is driven in the brake application direction. The rotating brake spindle 48 is supported on the nut 66 of the nut/spindle constructional unit 64 and moves, together with the interior sliding sleeve 20, in the direction of the release position. The locking nut 72 moves on the interior sliding sleeve 20 while the locking device 90 is open. When the tensioned condition of the interior accumulator-type spring 10 has been reached, which corresponds to the condition in the release position, the SR motor 24 is stopped by the control and regulating device, and the locking device 90 is changed into the locking position by the energizing of the solenoid coils 112, 112'. However, the tensioning of the interior accumulator-type spring 10 is also possible when the solenoid coils 112, 112' are already energized and the locking device 90 is therefore closed.

In an additional step, the exterior accumulator-type spring 12 is tensioned in that the SR motor 24 is operated in the reverse rotating direction; that is, in the release direction. The brake spindle 48, supported on the locked interior sliding sleeve 20, as a result of its rotation, screws the nut 66 of the nut/spindle constructional unit 64, together with the exterior sliding sleeve 16, in the direction of the release position. Subsequently, the SR motor 24 is switched off and the permanent magnet brake 34 is activated.

Although the present invention has been described and illustrated in detail, it is to be clearly understood that this is done by way of illustration and example only and is not to be taken by way of limitation. The scope of the present invention is to be limited only by the terms of the appended claims.

The invention claimed is:

1. Brake actuator for a rail vehicle brake, the actuator comprising:
    an accumulator-type brake unit with an energy accumulator for storing and supplying energy for applying the brake, in the event of a safety and/or parking braking, and having a locking device for locking and unlocking the energy accumulator;
    after the release of the locking device, an inertia weight can be caused to carry out a rotating movement for damping purposes by a portion of the energy released from the energy accumulator; and
    the inertia weight having at least one separate inertia element used only for generating mass of the inertia weight during the applying of the brake and not being used during release of the brake.

2. The brake actuator according to claim 1, wherein the forces and/or torques generated by the energy accumulator, when the locking device is locked, can be introduced at least by a part of the inertia weight into a housing of the brake actuator and can be supported there.

3. Brake actuator according to claim 2, wherein a transmission gearing with a transmission ratio in the range of from 3.0 to 8.0 is arranged between the energy accumulator and the inertia weight.

4. Brake actuator for a rail vehicle brake, the actuator comprising:
    an accumulator-type brake unit with an energy accumulator for storing and supplying energy for applying the brake, in the event of a safety and/or parking braking, and having a locking device for locking and unlocking the energy accumulator;
    after the release of the locking device, an inertia weight can be caused to carry out a rotating movement for damping purposes by a portion of the energy released from the energy accumulator;
    the inertia weight having at least one separate inertia element used only for generating mass of the inertia weight; and
    wherein the inertia weight is releasably coupled with the energy accumulator by a slipping clutch, which is designed such that, after a braking position has been reached, the inertia weight is uncoupled from the energy accumulator.

5. The brake actuator according to claim 4, wherein the inertia element includes an inertia disk, and the inertia weight further includes a shaft rotatably disposed in a housing of the locking device as well as a bevel gear; the inertia disk being arranged at one end of the shaft; the bevel gear being arranged at the other end of the shaft; and the bevel gear, together with a ring gear arranged perpendicular to the latter, forming the transmission gearing.

6. The brake actuator according to claim 5, wherein the ring gear can be non-rotatably coupled by the slipping clutch with a coaxial locking nut which can be screwed by a non-self-locking thread along a brake operating element linearly displaceable in the brake application direction; the brake operating element is acted upon by the energy accumulator.

7. The brake actuator according to claim 6, wherein the slipping clutch is formed by axial spur-type serrations of the ring gear, and the locking nut is held in a non-rotatable engagement by an axial spring's pretensioning.

8. The brake actuator according to claim 7, wherein the energy accumulator has at least one coil spring which, on one side, is supported on a housing of the brake actuator and, on the other side, is supported on the brake operating element.

9. The brake actuator according to claim 8, wherein the brake operating element contains a sleeve on whose outer circumference the non-self-locking thread is constructed.

10. The brake actuator according to claim 9, wherein the shaft of the inertia weight extends essentially perpendicular to the axial direction of the coil spring.

11. The brake actuator according to claim 10, wherein the locking device contains a brake which is applied to the inertia disk.

12. The brake actuator according to claim 11, wherein the brake of the locking device includes an electromagnetically operable solenoid cogwheel brake with a ring axially displaceably held by the inertia disk and forced by at least one pressure spring into the brake release position, which ring has a gear rim which, by the energizing of at least one solenoid coil, can be engaged against the effect of the pressure spring with another gear rim supported on the housing of the brake actuator.

13. The brake actuator according to claim 12, wherein the ring is arranged coaxial to the shaft and is displaceably received in an axial ring recess of the inertia disk along pins extending in the axial direction from the ring.

* * * * *